(12) United States Patent
Suzuki (10) Patent No.: US 11,289,269 B2
(45) Date of Patent: Mar. 29, 2022

(54) COIL UNIT, WIRELESS POWER TRANSMISSION DEVICE, WIRELESS POWER RECEIVING DEVICE, AND WIRELESS POWER TRANSMISSION SYSTEM

(71) Applicant: TDK CORPORATION, Tokyo (JP)

(72) Inventor: Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/021,138

(22) Filed: Sep. 15, 2020

(65) Prior Publication Data

US 2021/0090797 A1 Mar. 25, 2021

(30) Foreign Application Priority Data

Sep. 20, 2019 (JP) .............................. JP2019-171692

(51) Int. Cl.
*H01F 38/14* (2006.01)
*H01F 27/02* (2006.01)
*H02J 50/12* (2016.01)

(52) U.S. Cl.
CPC ........... *H01F 38/14* (2013.01); *H01F 27/025* (2013.01); *H02J 50/12* (2016.02)

(58) Field of Classification Search
None
See application file for complete search history.

(56) References Cited

U.S. PATENT DOCUMENTS

| | | | | |
|---|---|---|---|---|
| 10,763,024 B2* | 9/2020 | Shijo | ....................... | H01F 38/14 |
| 2011/0229708 A1* | 9/2011 | Asami | ..................... | H01L 24/97 |
| | | | | 428/316.6 |
| 2013/0114452 A1* | 5/2013 | Raoul | ................... | H04W 48/02 |
| | | | | 370/252 |
| 2013/0181667 A1* | 7/2013 | Takeshita | ............. | H04B 5/0075 |
| | | | | 320/108 |
| 2014/0253275 A1 | 9/2014 | Shijo et al. | | |
| 2015/0292511 A1* | 10/2015 | Sakai | ...................... | F04D 25/06 |
| | | | | 417/423.1 |
| 2015/0332839 A1* | 11/2015 | Stock | ........................ | H01F 3/08 |
| | | | | 320/108 |
| 2015/0340153 A1* | 11/2015 | Lohr | ..................... | H01M 10/46 |
| | | | | 336/200 |

(Continued)

FOREIGN PATENT DOCUMENTS

| | | |
|---|---|---|
| JP | 2013-172503 A | 9/2013 |
| JP | 2014-197663 A | 10/2014 |

(Continued)

*Primary Examiner* — Daniel Kessie
(74) *Attorney, Agent, or Firm* — Oliff PLC (57) ABSTRACT

There is provided a coil unit capable of decreasing an installation area while inhibiting transfer of heat to a capacitor. The coil unit includes: a coil made of a conductor in a spiral shape at least around a first axis; a capacitor module configured to include a substrate in which one or more capacitors are installed and be disposed to be separate from the coil in an axial direction of the first axis; a casing configured to have the coil and the capacitor module disposed inside; and a first resin configured to thermally connect at least a part of the coil and at least a part of the casing, wherein the first resin is separate from the capacitors and the substrate.

12 Claims, 4 Drawing Sheets

(56) References Cited

U.S. PATENT DOCUMENTS

| | | | | |
|---|---|---|---|---|
| 2015/0348696 | A1* | 12/2015 | Lohr | H02J 7/025 |
| | | | | 336/840 |
| 2017/0040845 | A1* | 2/2017 | Yuasa | H02J 50/12 |
| 2017/0125153 | A1* | 5/2017 | Yoshioka | H01F 5/003 |
| 2017/0237295 | A1* | 8/2017 | Yuasa | H01F 27/24 |
| | | | | 307/104 |
| 2017/0290143 | A1* | 10/2017 | Ito | H01L 23/5383 |
| 2017/0326994 | A1* | 11/2017 | Yuasa | H01M 10/46 |
| 2018/0170192 | A1* | 6/2018 | Yuasa | B60L 53/38 |
| 2018/0254136 | A1* | 9/2018 | Ueda | H01F 27/10 |
| 2020/0118738 | A1* | 4/2020 | Yuasa | H01F 27/367 |
| 2020/0126717 | A1* | 4/2020 | Nakamura | H02J 50/12 |
| 2020/0152376 | A1* | 5/2020 | Nakane | B60L 53/12 |

FOREIGN PATENT DOCUMENTS

| | | |
|---|---|---|
| WO | 2012/039077 A1 | 3/2012 |
| WO | 2019/009062 A1 | 1/2019 |

* cited by examiner

COIL UNIT, WIRELESS POWER TRANSMISSION DEVICE, WIRELESS POWER RECEIVING DEVICE, AND WIRELESS POWER TRANSMISSION SYSTEM

BACKGROUND OF THE INVENTION

Field of the Invention

The present invention relates to a coil unit, a wireless power transmission device, a wireless power receiving device, and a wireless power transmission system.

Priority is claimed on Japanese Patent Application No. 2019-171692, filed Sep. 20, 2019, the content of which is incorporated herein by reference.

Description of Related Art

Technologies relating to wireless power transmission systems performing wireless power transmission through magnetic fields have been researched and developed. In description here, wireless power transmission is wireless transmission of electric power.

In relation to this, a wireless power transmission device that performs wireless power transmission for a wireless power receiving device mounted in a mobile body, includes a bottom plate having an installation face, a power transmission coil supplying electric power to a power receiving coil that is disposed on the bottom plate and is included in the wireless power receiving device, and a cover mounted on the bottom plate such that it covers the power transmission coil, and has an air layer formed between the power transmission coil and the cover is known (see Patent Document 1).

PATENT DOCUMENTS

[Patent Document 1] PCT International Publication No. WO2012/039077

SUMMARY OF THE INVENTION

Here, in a wireless power transmission device described in Patent Document 1, a power transmission coil and a capacitor module are respectively disposed in two spaces that are partitioned inside a cover. In accordance with this, the wireless power transmission device can inhibit transfer of heat generated in the power transmission coil to the capacitor module. However, there are cases in which it is difficult to decrease the installation area of the wireless power transmission device due to the presence of the two spaces formed inside the cover.

Meanwhile, as a method for decreasing the installation area of the wireless power transmission device described in Patent Document 1, there is a method in which the power transmission coil and the capacitor module are disposed inside one space inside the cover. However, in a case in which this method is applied to the wireless power transmission device, although the installation area of the wireless power transmission device can be configured to be small, it becomes difficult to inhibit transfer of heat generated in the power transmission coil to the capacitor module. In other words, in the wireless power transmission device, there are cases in which it is difficult to achieve both inhibition of transfer of heat to the capacitor and a decrease in the installation area.

In view of such situations, an object of the present invention is to provide a coil unit, a wireless power transmission device, a wireless power receiving device, and a wireless power transmission system capable of decreasing an installation area while inhibiting the transfer of heat to a capacitor.

An aspect of the present invention is a coil unit including: a coil made of a conductor in a spiral shape at least around a first axis; a capacitor module configured to include a substrate in which one or more capacitors are installed and be disposed to be separate from the coil in an axial direction of the first axis; a casing configured to have the coil and the capacitor module disposed inside; and a first resin configured to thermally connect at least a part of the coil and at least a part of the casing, wherein the first resin is separate from the capacitors and the substrate.

According to the present invention, an installation area can be decreased while inhibiting transfer of heat to a capacitor.

DETAILED DESCRIPTION OF THE INVENTION

<Embodiment>

Hereinafter, an embodiment of the present invention will be described with reference to the drawings. Here, a coil according to an embodiment is a conductor wound around at least one of a certain area and a certain object or a conductor wound in a spiral shape around at least one of a certain area and a certain object and does not include a conductor as a lead wire connected from the conductor to another circuit.

<Configuration of Wireless Power Transmission System>

Figure 1:
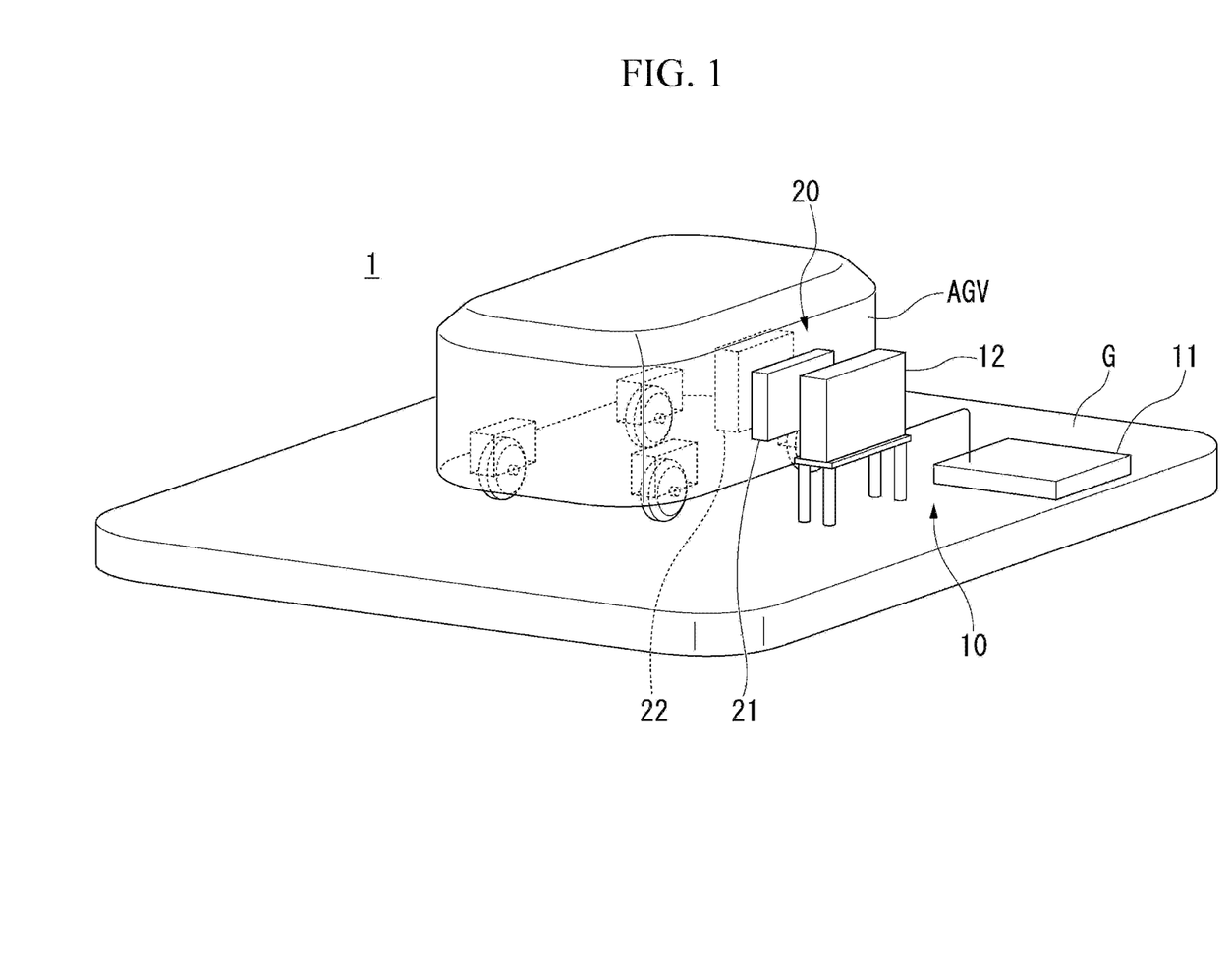
FIG. 1 is a diagram illustrating an example of the configuration of a wireless power transmission system 1.

Hereinafter, the configuration of a wireless power transmission system 1 will be described with reference to FIG. 1. FIG. 1 is a diagram illustrating an example of the configuration of the wireless power transmission system 1.

The wireless power transmission system 1 includes a wireless power transmission device 10 and a wireless power receiving device 20.

The wireless power transmission device 10 includes a power transmission unit 11 and a power transmission coil unit 12. Meanwhile, the wireless power receiving device 20 includes a power receiving coil unit 21 and a power receiving unit 22. The wireless power receiving device 20 can be connected to a load. A load is a resistance load of which an equivalent resistance value changes with time in accordance with a demand state (a storage state or a consumption state) of electric power. In the example illustrated in FIG. 1, the wireless power receiving device 20 is connected to a battery mounted in a mobile body as such a load. The mobile body, for example, is an AGV (Automated Guided Vehicle). The mobile body may be any other device that is controlled using electricity instead of the AGV. The wireless power receiving device 20 may be configured to be connected to a motor mounted in a mobile body instead of the battery or may be configured to be connected to another load. In addition, the wireless power receiving device 20 may be configured to include a load.

The power transmission unit 11, for example, is connected to a commercial power supply disposed outside and converts an AC (Alternating Current) voltage input from the commercial power supply into a DC (Direct Current) voltage having a desired voltage value. Then, the power transmission unit 11 converts the converted DC voltage into an AC voltage of a drive frequency. The power transmission unit 11 is connected to the power transmission coil unit 12. The power transmission unit 11 supplies an AC voltage of a drive frequency to the power transmission coil unit 12.

The power transmission unit 11, for example, includes an AC/DC converter, an inverter composed of a switching circuit in which a plurality of switching elements are bridge-connected, and the like. The power transmission unit 11 may have a configuration including a circuit combining a rectification and smoothing circuit that converts an AC voltage into a DC voltage through rectification and a PFC (Power Factor Correction) circuit performing power factor improvement, a configuration including a circuit in which the rectification and smoothing circuit and a switching circuit such as a switching converter are combined, or a configuration including any other circuit that converts an AC voltage into a DC voltage having a predetermined voltage value instead of the AC/DC converter. The power transmission unit 11 may have a configuration including another circuit that converts a DC voltage into an AC voltage instead of the inverter.

The power transmission coil unit 12 includes a coil that functions as an antenna for wireless power transmission as a power transmission coil L1 not illustrated in FIG. 1. In other words, the power transmission coil L1 generates an AC magnetic field in accordance with an AC voltage supplied from the power transmission unit 11. In accordance with this, the power transmission coil unit 12 transmits power to the wireless power receiving device 20 using wireless power transmission through the power transmission coil L1. In addition, the power transmission coil unit 12 includes a capacitor not illustrated in FIG. 1 as a circuit element that configures a transmission-side resonance circuit together with the power transmission coil L1 in the power transmission coil unit 12. The power transmission coil unit 12 may be configured to include a magnetic body raising magnetic coupling between the power transmission coil L1 and a power receiving coil L2 to be described below, an electromagnetic shield body (for example, a metal plate or the like) inhibiting leakage of a magnetic field generated by the power transmission coil L1 to the outside, and the like.

The power transmission coil L1, for example, is a wireless power transmission coil made by winding a Litz wire formed using copper, aluminum, or the like in a spiral shape. The power transmission coil L1 according to this embodiment is installed on a ground surface G such that it faces a side face of a mobile body. Hereinafter, as an example, a case in which the power transmission coil L1 (in other words, the power transmission coil unit 12) is installed on the ground surface G together with the power transmission unit 11 will be described. In the example illustrated in FIG. 1, the power transmission unit 11 and the power transmission coil unit 12 are separated bodies. However, the power transmission unit 11 and the power transmission coil unit 12 may be integrally configured.

In the embodiment, a control circuit that controls the wireless power transmission device 10 may be any circuit as long as it is a control circuit that can realize wireless power transmission performed between the wireless power transmission device 10 and the wireless power receiving device 20. For this reason, in the embodiment, description of the control circuit that controls the wireless power transmission device 10 will be omitted.

The power receiving coil unit 21 includes a coil that functions as an antenna for wireless power transmission as the power receiving coil L2 not illustrated in FIG. 1. The power receiving coil unit 21 receives electric power from the wireless power transmission device 10 using wireless power transmission performed through the power receiving coil L2. In addition, the power receiving coil unit 21 includes a capacitor as a circuit element configuring a receiving-side resonance circuit together with the power receiving coil L2. The power receiving coil unit 21 may be configured to include a magnetic body raising magnetic coupling between the power receiving coil L2 and the power transmission coil L1, an electromagnetic shield body (for example, a metal plate or the like) inhibiting leakage of a magnetic field generated by the power receiving coil L2 to the outside, and the like.

The power receiving coil L2, for example, is a wireless power transmission coil made by winding a Litz wire formed using copper, aluminum, or the like in a spiral shape. The power receiving coil L2 according to this embodiment is installed on a side face of a mobile body such that it faces the power transmission coil L1 of the power transmission coil unit 12 installed on the ground surface G. Hereinafter, as an example, a case in which the power receiving coil L2 (in other words, the power receiving coil unit 21) is installed on a side face of the mobile body together with the power receiving unit 22 will be described. In the example illustrated in FIG. 1, the power receiving coil unit 21 and the power receiving unit 22 are separated bodies. However, the power receiving coil unit 21 and the power receiving unit 22 may be integrally configured.

The power receiving unit 22 is connected to the power receiving coil unit 21 and converts an AC voltage supplied from the power receiving coil L2 into a DC voltage through rectification. In the embodiment, the power receiving unit 22 is connected to a load (the mobile body in the example illustrated in FIG. 1). In a case in which the power receiving unit 22 is connected to a load, the power receiving unit 22 supplies the converted DC voltage to the load. In the wireless power receiving device 20, the power receiving unit 22 may be configured to be connected to the load through a charging circuit.

The power receiving unit 22, for example, includes a rectification circuit that rectifies an AC voltage, a smoothing circuit that converts a voltage rectified by the rectification circuit into a DC voltage through smoothing, and the like. The power receiving unit 22 may be configured to include other circuits.

In the embodiment, a control circuit that controls the wireless power receiving device 20 may be any circuit as long as it is a control circuit that can realize wireless power transmission performed between the wireless power transmission device 10 and the wireless power receiving device 20. For this reason, in the embodiment, description of the control circuit that controls the wireless power receiving device 20 will be omitted.

Here, in the embodiment, the configuration of the power transmission coil unit 12 may be the same as the configuration of the power receiving coil unit 21 or may be different from the configuration of the power receiving coil unit 21. Hereinafter, as an example, a case in which the configuration of the power transmission coil unit 12 is the same as the configuration of the power receiving coil unit 21 will be described.

Thus, hereinafter, for the convenience of description, as long as the power transmission coil unit 12 and the power receiving coil unit 21 do not need to be distinguished from each other, they will be collectively referred to as a coil unit CU in description. Hereinafter, for the convenience of description, as long as the power transmission coil L1 and the power receiving coil L2 do not need to be distinguished from each other, they will be referred to as a coil L in description. In addition, hereinafter, for the convenience of description, as long as the transmission-side resonance circuit included in the power transmission coil unit 12 and the receiving-side resonance circuit included in the power receiving coil unit 21 do not need to be distinguished from each other, they will be collectively referred to a resonance circuit in description.

<Configuration of Coil Unit>

Figure 2:
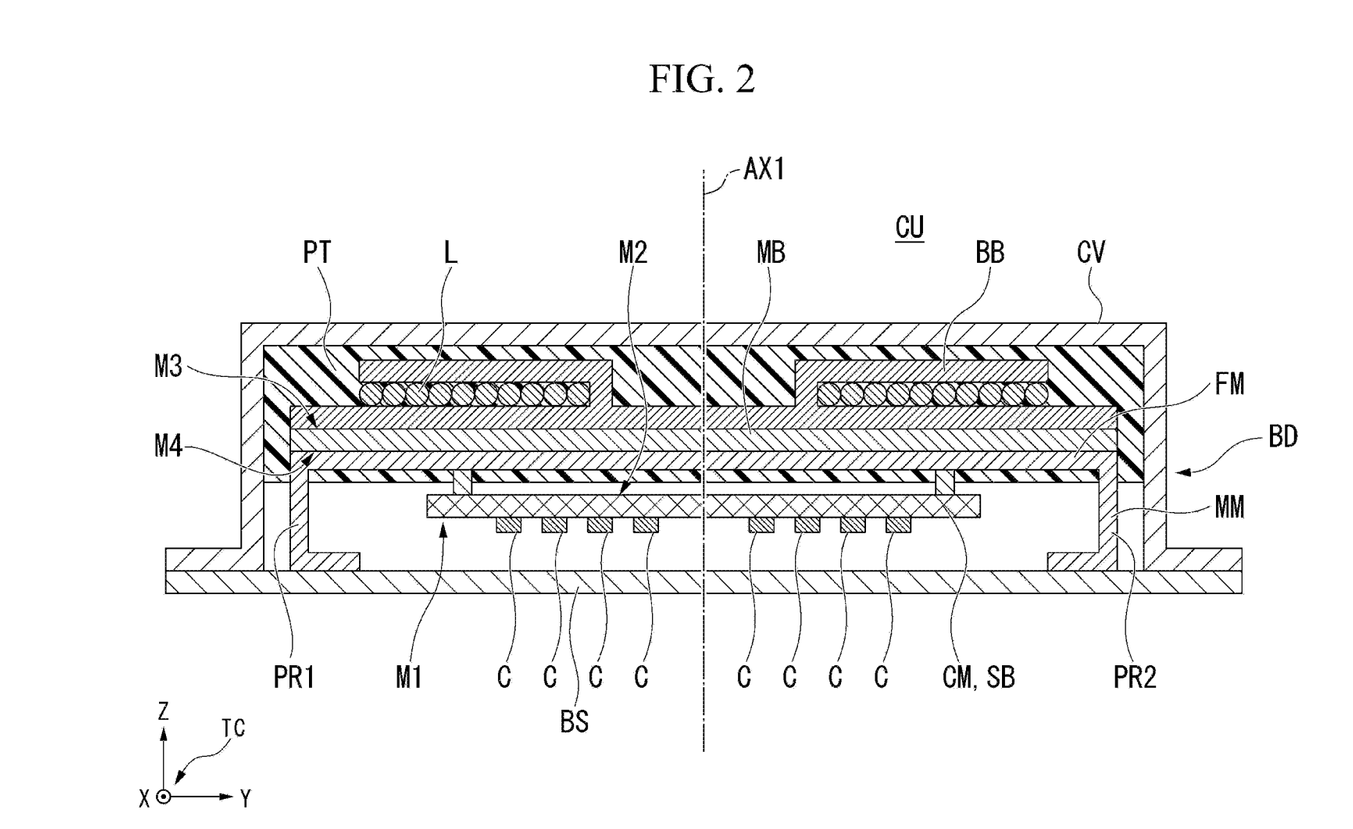
FIG. 2 is a diagram illustrating an example of the configuration of a coil unit CU.

Hereinafter, the configuration of the coil unit CU will be described with reference to FIG. 2. FIG. 2 is a diagram illustrating an example of the configuration of the coil unit CU.

Here, a three-dimensional coordinate system TC is a three-dimensional orthogonal coordinate system that represents directions in a diagram in which the three-dimensional coordinate system TC is drawn. Hereinafter, for the convenience of description, an X axis in the three-dimensional coordinate system TC will be simply referred to as an X axis in description. In addition, hereinafter, for the convenience of description, a Y axis in the three-dimensional coordinate system TC will be simply referred to as a Y axis in description. Furthermore, hereinafter, for the convenience of description, a Z axis in the three-dimensional coordinate system TC will be simply referred to as a Z axis in description. Hereinafter, for the convenience of description, a positive direction of the Z axis will be referred to as an upper side or an upward direction, and a negative direction of the Z axis will be referred to as a lower side or a downward direction in description.

FIG. 2 is a cross-sectional view of the coil unit CU through a first axis AX1 to be described below in a case in which the coil unit CU is cut along a plane parallel to the first axis AX1. The cross-sectional view illustrated in FIG. 2 is a cross-sectional view of the coil unit CU in a case in which the coil unit is cut along a plane parallel to the Y axis. In FIG. 2, in order to prevent complications of the drawing, cables routed inside the coil unit CU are omitted. In addition, in FIG. 2, in order to prevent complications of the drawing, conductors drawn out from the coil L are also omitted.

The coil unit CU includes a casing BD, a coil L, a bobbin BB, a capacitor module CM, a magnetic body MB, a metal member MM, and a resin PT.

The casing BD is a casing of the coil unit CU. The casing BD includes a base member BS and a cover member CV that can be assembled into the base member BS.

The base member BS is a member that has a face on which an object can be disposed among members included in the casing BD. In the example illustrated in FIG. 2, the base member BS is a member that has a flat plate shape. The shape of the base member BS may be another shape having a face instead of a flat plate shape.

Hereinafter, as an example, a case in which two faces of the base member BS that has a flat plate shape are orthogonal to the Z axis will be described.

The base member BS is a member made of metal. The material of the base member BS, for example, is aluminum. The material of the base member BS may be any other metal instead of aluminum.

On the base member BS, the coil L, the bobbin BB, the capacitor module CM, the magnetic body MB, and the metal member MM are disposed.

The cover member CV is a member that is a cover covering objects disposed on the base member BS (in other words, the coil L, the bobbin BB, the capacitor module CM, the magnetic body MB, the metal member MM, and the like) among members included in the casing BD together with the base member BS. In other words, the cover member CV configures an outer wall of the casing BD together with the base member BS. In a case in which the cover member CV is assembled into the base member BS, a space covered with the base member BS and the cover member CV is formed between the base member BS and the cover member CV. This space is a space inside the casing BD and is a space in which the objects are disposed inside the casing BD. In other words, a space formed between the base member BS and the cover member CV is a space in which the objects are stored.

The cover member CV is a member that is made of resin. The material of the cover member CV, for example, is a polybutylene terephthalate resin. The material of the cover member CV may be any other resin instead of a polybutylene terephthalate resin.

The coil L is a coil made by winding a conductor around the first axis AX1 in a spiral shape (in other words, a spiral coil). In other words, the coil L is a coil made of a conductor in a spiral shape at least around the first axis AX1. The coil L may be a multi-layer coil. Here, the first axis AX1 is a virtual axis. In the example illustrated in FIG. 2, the coil L is disposed inside the casing BD such that an upper face of the base member BS and the first axis AX1 are orthogonal to each other. In other words, in the example, the first axis AX1 is an axis that is parallel to the Z axis. The coil L may be configured to be disposed inside the casing BD such that the upper face of the base member BS and the first axis AX1 are oblique with respect to each other or may be configured to be disposed inside the casing BD such that the upper face of the base member BS and the first axis AX1 are parallel to each other. Here, the upper face of the base member BS is a face that is positioned on the upper side out of two faces of the base member BS.

The coil L has an opening. For this reason, the coil L may be regarded to have a virtual coil face having a thickness including the conductor wound as the coil L and the opening included in the coil L. In a case in which there are no bends, distortion, or the like in the conductor wound as the coil L, the coil face is a face that is orthogonal to the first axis AX1. In the example illustrated in FIG. 2, the coil face is drawn as a face that is completely orthogonal to the first axis AX1.

The coil L may be a coil made by winding a conductor around each of two or more virtual axes, which are parallel to each other, in a spiral shape or may be a coil other than a spiral coil such as a solenoid coil.

The coil L is disposed inside the casing BD via the bobbin BB. The bobbin BB is a jig that fixes a conductor when the conductor is wound as the coil L. The shape of the bobbin BB may be any shape as long as the shape is a shape to which a conductor can be fixed when the conductor is wound as the coil L. In the example illustrated in FIG. 1, the shape of the bobbin BB is a shape having a part in which the conductor wound as the coil L is wound and a part in which a part of the conductor has the coil L interposed therebetween from above and below without deviating from the coil face in upward and downward directions. In the example, a lower face of the bobbin BB is a face that is positioned between the coil L and the capacitor module CM in the axial direction of the first axis AX1 and is orthogonal to the first axis AX1. The coil unit CU may be configured not to include the bobbin BB. In such a case, the coil L may be configured to be supported by a certain support member inside the casing BD or may be configured to be fixed to another object (for example, the magnetic body MB) using an adhesive or the like inside the casing BD.

The capacitor module CM is a module that includes a substrate in which one or more capacitors C are installed. Hereinafter, as an example, as illustrated in FIG. 2, a case in which the capacitor module CM includes a substrate SB in which eight capacitors C are installed as the substrate will be described. The substrate SB is a flat plate-shaped substrate having a first main face M1 on which eight capacitors C are installed and a second main face M2 that faces the first main face M1. The substrate SB may have another shape having the first main face M1 instead of a flat plate shape.

The capacitor module CM is disposed to be separate from the coil L in the axial direction of the first axis AX1 inside the casing BD. In the example illustrated in FIG. 2, the capacitor module CM is positioned below the coil L. In the example, the capacitor module CM is disposed inside the casing BD such that the first main face M1 and the second main face M2 are orthogonal to the first axis AX1. In the example, the capacitor module CM is disposed inside the casing BD such that the first main face M1 is positioned on a side away from the coil L with respect to the second main face M2 in the axial direction of the first axis AX1. In other words, the first main face M1 is farther from the coil L than the second main face M2 in the axial direction of the first axis AX1. In accordance with this, the coil unit CU can inhibit transfer of heat generated in the coil L to the capacitor C compared with in a case in which the second main face M2 is positioned on a side away from the coil L with respect to the first main face M1 in the axial direction of the first axis AX1. The first main face M1 and the second main face M2 may be configured to be inclined with respect to the first axis AX1.

The capacitor module CM is separate from the coil L with a separation layer interposed therebetween. Here, the separation layer is a layer of at least one of a gas and a vacuum. The gas, for example, may be air or a gas other than air such as nitrogen.

The magnetic body MB is an example of a magnetic body that raises magnetic coupling between the power transmission coil L1 and the power receiving coil L2. The magnetic body MB, for example, is a ferrite body. The magnetic body MB may be any other magnetic body other than a ferrite body.

The magnetic body MB is positioned between the coil L and the capacitor module CM inside the casing BD. In other words, the magnetic body MB is disposed to be separate from the coil L wound around the bobbin BB in the axial direction of the first axis AX1. In the example illustrated in FIG. 2, the magnetic body MB is positioned below the bobbin BB around which the conductor as the coil L is wound.

In the example illustrated in FIG. 2, the shape of the magnetic body MB is a flat plate shape. The shape of the magnetic body MB may be any other shape such as a disc shape instead of a flat plate shape as long as the shape is a shape for which magnetic coupling between the power transmission coil L1 and the power receiving coil L2 can be raised. Hereinafter, for the convenience of description, an upper face of the magnetic body MB will be referred to as a third main face M3, and a lower face of the magnetic body MB will be referred to as a fourth main face M4 in description. The upper face of the magnetic body MB is a face that is positioned on an upper side out of faces of the magnetic body MB. The lower face of the magnetic body MB is a face positioned on a lower side out of faces of the magnetic body MB.

In the example illustrated in FIG. 2, the third main face M3 and the lower face of the bobbin BB are brought into contact with each other on a surface. In other words, in the example, the third main face M3 and the fourth main face M4 are faces that are orthogonal to the first axis AX1. For this reason, the third main face M3 and the fourth main face M4 face a coil face of the coil L. The third main face M3 and the lower face of the bobbin BB may be configured not to be brought into contact (or contact on a surface) with each other in part or at all. In such a case, another object such as an adhesive may be configured to the positioned in at least a part of a gap positioned between the third main face M3 and the lower face of the bobbin BB. In other words, the third main face M3 and the bobbin BB may be configured to be bonded together using an adhesive or the like.

The metal member MM is a member that performs housing of the capacitor module CM, dissipation of heat generated from the coil L, and the like inside the casing BD. In the example illustrated in FIG. 2, the metal member MM supports the coil L from the bottom inside the casing BD. More specifically, in this example, the metal member MM supports the coil L through the magnetic body MB and the bobbin BB.

The material of the metal member MM, for example, is aluminum. The material of the metal member MM may be any other metal instead of aluminum.

Here, the metal member MM has a flat plate portion FM and a protruding portion PR.

The flat plate portion FM is one of parts that form a space housing the capacitor module CM inside the casing BD among parts of the metal member MM. In addition, in the example illustrated in FIG. 2, the flat plate portion FM supports the coil L inside the casing BD. In other words, the flat plate portion FM forms a ceiling of a space that houses the capacitor module CM inside the casing BD. In the example illustrated in FIG. 2, the shape of the flat plate portion FM is a flat plate shape. The shape of the flat plate portion FM may be any other shape that can form a space housing the capacitor module CM inside the casing BD (in other words, can form a ceiling) instead of a flat plate shape.

The flat plate portion FM is positioned between the coil L and the capacitor module CM in the axial direction of the first axis AX1. In the example illustrated in FIG. 2, the flat plate portion FM is disposed inside the casing BD such that an upper face and a lower face of the flat plate portion FM are orthogonal to the axial direction of the first axis AX1. In other words, in this example, the metal member MM is disposed inside the casing BD such that the upper face and the lower face of the flat plate portion FM are orthogonal to the first axis AX1. In this example, the upper face of the flat plate portion FM is brought into contact with the fourth main face M4 of the magnetic body MB on a surface. Here, the upper face of the flat plate portion FM is a face that is positioned on an upper side out of two faces of the flat plate portion FM. In addition, the lower face of the flat plate portion FM is a face that is positioned on a lower side out of the two faces of the flat plate portion FM. Inside the casing BD, the upper face and the lower face of the flat plate portion FM may be configured to be inclined with respect to the first axis AX1. In addition, the upper face of the flat plate portion FM and the fourth main face M4 may be configured not to be brought into contact with each other (or brought into contact on a surface) in a part or at all. In such a case, another object such as an adhesive may be configured to be positioned in at least a part of a gap positioned between the upper face of the flat plate portion FM and the fourth main face M4. In other words, the upper face of the flat plate portion FM and the fourth main face M4 may be configured to be bonded together using an adhesive or the like.

The protruding portion PR is a part that forms a space housing the capacitor module CM inside the casing BD together with the flat plate portion FM among parts of the metal member MM. In addition, the protruding portion PR is a part that connects the metal member MM to the casing BD (so to speak, a part that serves as a leg of the metal member MM). The protruding portion PR is a part that protrudes from the flat plate portion FM in a direction from the coil L to the capacitor module CM in the axial direction of the first axis AX1, in other words, in the negative direction of the Z axis inside the casing BD. In the example illustrated in FIG. 2, the metal member MM has two protruding portions including a first protruding portion PR1 and a second protruding portion PR2 as protruding portions PR. In this example, the first protruding portion PR1 protrudes from an end of the flat plate portion FM, which is disposed on the negative side of the Y axis in a direction orthogonal to the first axis AX1, in the negative direction of the Z axis. In this example, the second protruding portion PR2 protrudes from an end of the flat plate portion FM, which is disposed on the positive side of the Y axis in a direction orthogonal to the first axis AX1, in the negative direction of the Z axis. In this example, the first protruding portion PR1 and the second protruding portion PR2 connect the metal member MM to the base member BS of the casing BD.

Any object can be disposed in a space surrounded by the lower face of the flat plate portion FM, the first protruding portion PR1, and the second protruding portion PR2. For this reason, in the coil unit CU, as illustrated in FIG. 2, the capacitor module CM is disposed in this space. In other words, the metal member MM houses the capacitor module CM in this way. In this way, in the coil unit CU, the coil L and the capacitor module CM can be disposed inside one space inside the casing DB, and, as a result, the setting area can be configured to be small.

The lower face of the flat plate portion FM and the second main face M2 are a predetermined distance away from each other. The predetermined distance may be any distance for which the space becomes the separation layer described above. In accordance with this, the coil L and the capacitor module CM are separate from each other with the separation layer interposed therebetween as described above. In order to dispose the capacitor module CM inside the space, the capacitor module CM needs to be supported by a certain support member. For example, the capacitor module CM may be configured to be connected to the upper face of the base member BS using a certain support member. For example, the capacitor module CM may be connected to the flat plate portion FM using a certain support member. In the example illustrated in FIG. 2, on the lower face of the flat plate portion FM, the capacitor module CM is disposed inside the space through a support member that connects the flat plate portion FM and the second main face M2 of the substrate SB of the capacitor module CM. Preferably, the material of the support member is a material having a thermal conductivity as low as possible such that heat generated in the coil L is not transferred to the capacitor C. In this example, although the support member is a member having a rod shape, the shape is not limited thereto. However, the shape of the support member should not be a shape that fills in all the space between the flat plate portion FM and the second main face M2 of the substrate SB of the capacitor module CM. The reason for this is that, in such a case, a separation layer is not formed between the lower face of the flat plate portion FM and the second main face M2, and heat generated in the coil L can be easily transferred to the capacitor C. For this reason, it is preferable that the support member be as small as possible on the premise that in this case it can support the capacitor module CM. In this way, in the embodiment, a state in which the capacitor module CM is connected to the flat plate portion FM using a support member having such a small size that the transfer of heat from the coil L to the capacitor module CM can be ignored is handled as a state in which the coil L and the capacitor module CM are separate from each other with the separation layer interposed therebetween.

The resin PT thermally connects at least a part of the coil L and at least a part of the casing BD. Here, in the embodiment, the resin PT thermally connecting a certain object X1 and another object X2 means that the resin PT is brought into contact with the object X1 and the object X2 such that heat transfer occurs between the object X1 and the object X2. In addition, in the embodiment, the resin PT being thermally connected to the object X1 means that the resin PT is brought into contact with the object X1 such that heat transfer occurs between the object X1 and the resin PT. Furthermore, in the embodiment, the resin PT being thermally connected to the object X1 and the resin PT being thermally connected to the object X2 means that the resin PT thermally connecting the object X1 and the object X2. Each of the object X1 and the object X2 may be any object and, for example, is the coil L, the casing BD, the magnetic body MB, the metal member MM, or the like.

In other words, inside the casing BD, at least a part of the coil L and at least a part of the casing BD are thermally connected using the resin PT. Inside the casing BD, the resin PT is also thermally connected to at least a part of the magnetic body MB. In addition, inside the casing BD, the resin PT is thermally connected to at least a part of the metal member MM. Here, the resin PT is separate from the capacitor C and the substrate SB with the separation layer interposed therebetween. In other words, the resin PT is spatially separate from the capacitor C and the substrate SB with the separation layer interposed therebetween. In the embodiment, the resin PT being spatially separate from the capacitor C and the substrate SB with the separation layer interposed therebetween means that the resin PT and the capacitor C are not in contact with each other and the resin PT and the substrate SB are not in contact with each other. For this reason, the resin PT is not thermally connected to the capacitor C and the substrate SB. In accordance with these, the coil unit CU can inhibit transfer of heat generated in the coil L to the capacitor C through the resin PT. In addition, in accordance with this, the coil unit CU transfers heat to the cover member CV through the resin PT and can decrease the amount of heat transferred to the base member BS through the metal member MM.

For example, inside the casing BD, the resin PT is filled into a part of the inside of the casing BD and thermally connects at least a part of the casing BD, at least a part of the coil L, at least a part of the magnetic body MB, and at least a part of the metal member MM. In the example illustrated in FIG. 2, the resin PT covers the coil L and the magnetic body MB, the flat plate part FM of the metal member MM and parts of the protruding portions PR of the metal member MM and is filled into the casing BD not to cover the capacitor module CM. For this reason, in this example, the entire lower face of the flat plate portion FM is thermally connected to the resin PT. In other words, the entire lower face of the flat plate portion FM is covered with the resin PT. In accordance with this, the coil unit CU can inhibit transfer of heat generated in the coil L to the capacitors C more efficiently. In addition, in accordance with this, the coil unit CU can decrease the amount of heat transferred to the base member BS through the metal member MM more reliably by increasing the amount of heat transferred to the cover member CV. In the example illustrated in FIG. 2, at least a part of the lower face of the flat plate portion FM may be configured not to be thermally connected to the resin PT. In other words, at least a part of the lower face of the flat plate portion FM may be configured not to be covered with the resin PT. Also in such a case, the coil unit CU may increase the amount of heat transferred to the cover member CV.

Here, the form of filling the resin PT in the casing BD is preferably a filling form in which the temperature of the cover member CV becomes higher than the temperature of the base member BS in accordance with heat generated in the coil L when the coil unit CU is normally used. In other words, the resin PT is filled into the casing BD in such a way a temperature of the base member BD to be higher than a temperature of the cover member CV by a heat generated in the coil L. The reason for this is that the amount of heat transferred from the base member BS of a certain temperature to a person in a case in which the base member BS made of metal and the person are brought into thermally contact with each other on a certain time is more than the amount of heat transferred from the cover member CV of the certain temperature to a person in a case in which the cover member CV made of resin and the person are thermally brought into contact with each other on the certain time. An example of such a filling form is a filling form of the resin PT illustrated in FIG. 2. More specifically, the filling form is a filling form of the resin PT in which the base member BS faces only a space including the capacitor module CM among spaces inside the casing BD, and the resin PT is not filled into the space. Hereinafter, for the convenience of description, among spaces inside the casing BD, a space into which the resin PT is filled will be referred to as a first space, and a space into which the resin PT is not filled will be referred to as a second space in description. In other words, in the example illustrated in FIG. 2, in the coil unit CU, the capacitor module CM is disposed inside the second space, and the bobbin BB around which the coil L is wound, the magnetic body MB, and a part of the metal member MM are disposed inside the first space. A filling form of the resin PT in which the temperature of the cover member CV becomes higher than the temperature of the base member BS in accordance with heat generated in the coil L when the coil unit CU is normally used may be found through trial-and-error or may be found through a thermal simulation.

In this way, in the example illustrated in FIG. 2, the bobbin BB around which the coil L is wound, the magnetic body MB, and a part of the metal member MM are disposed inside the first space. For this reason, the bobbin BB around which the coil L is wound is fixed not to be movable relative to the magnetic body MB using the resin PT. In addition, the magnetic body MB is fixed not to be movable with respect to the metal member MM using the resin PT. In other words, the bobbin BB around which the coil L is wound is fixed not to be movable with respect to the metal member MM using the resin PT. In other words, the coil L is fixed not to be movable with respect to the magnetic body MB using the resin PT. The coil L is fixed not to be movable with respect to the metal member MM using the resin PT. As a result, in the coil unit CU, a member that fixes the coil L, the magnetic body MB, and the metal member MM not to be relatively movable with respect to each other does not need to be installed.

The resin PT, for example, may be a string-shaped resin. In such a case, the resin PT is not filled into a part of the space inside the casing BD and thermally connects at least a part of the coil L and at least a part of the casing BD. In this case, the resin PT is not filled into a part of the space inside the casing BD and thermally connects at least a part of the magnetic body MB and at least a part of the casing BD. In addition, in this case, the resin PT is not filled into a part of the space inside the casing BD and thermally connects at least a part of the metal member MM and at least a part of the casing BD.

In the casing BD, the resin PT may be configured not to be thermally connected to one or both of at least a part of the magnetic body MB and at least a part of the metal member MM.

The resin PT, for example, is a polyurethane-based resin. The resin PT may be any other resin instead of the polyurethane-based resin. Here, the resin PT is preferably a resin having a high thermal conductivity for easily transferring heat generated in the coil L to the cover member CV.

When the resin PT is filled into the first space, the resin PT enters into also at least a part of a space between the coil L and the bobbin BB. In other words, at least a part of the space between the coil L and the bobbin BB is buried in the resin PT. In accordance with this, the coil unit CU can transfer heat generated in the coil to the cover member CV more efficiently. Here, the resin PT in which at least a part of the space between the coil L and the bobbin BB is buried may be configured not to be thermally connected to the resin PT that thermally connects at least a part of the coil L and at least a part of the casing BD or may be configured to be thermally connected to the resin PT that thermally connects at least a part of the coil L and at least a part of the casing BD.

In addition, in a case in which the coil unit CU does not include the bobbin BB, for example, the coil L is disposed on the third main face M3 of the magnetic body MB. In such a case, when the resin PT is filled into the first space, the resin PT enters also in at least a part of the space between the coil L and the magnetic body MB. In other words, at least a part of the space between the coil L and the magnetic body MB is buried in the resin PT. In accordance with this, even in such a case, the coil unit CU can transfer heat generated in the coil L to the cover member CV more efficiently. Here, the resin PT in which at least a part of the space between the coil L and the magnetic body MB is buried may be configured not to be thermally connected to the resin PT that thermally connects at least a part of the coil L and at least a part of the casing BD or may be configured to be thermally connected to the resin PT that thermally connects at least a part of the coil L and at least a part of the casing BD. The resin PT in which at least a part of the space between the coil L and the magnetic body MB is buried is an example of a second resin.

When the resin PT is filled into the first space, the resin PT enters into also at least a part of the space between the magnetic body MB and the metal member MM. In other words, at least a part of the space between the magnetic body MB and the metal member MM is buried in the resin PT. In accordance with this, the coil unit CU can transfer heat generated in the coil L to the cover member CV more efficiently. The resin PT in which at least a part of the space between the magnetic body MB and the metal member MM is buried may be configured not to be thermally connected to the resin PT that thermally connects at least a part of the coil L and at least a part of the casing BD or may be configured to be thermally connected to the resin PT that thermally connects at least a part of the coil L and at least a part of the casing BD. The resin PT in which at least a part of the space between the magnetic body MB and the metal member MM is buried is an example of a third resin.

In a case in which the coil unit CU does not include the bobbin BB and the magnetic body MB, for example, the coil L is disposed on an upper face of the flat plate portion FM of the metal member MM. In such a case, when the resin PT is filled into the first space, the resin PT enters into also at least a part of the space between the coil L and the metal member MM. In other words, at least a part of the space between the coil L and the metal member MM is buried in the resin PT. In accordance with this, the coil unit CU can transfer heat generated in the coil L to the cover member CV more efficiently. Here, the resin PT in which at least a part of the space between the coil L and the metal member MM is buried may be configured not to be thermally connected to the resin PT that thermally connects at least a part of the coil L and at least a part of the casing BD or may be configured to be thermally connected to the resin PT that thermally connects at least a part of the coil L and at least a part of the casing BD.

In a case in which the coil unit CU does not include the magnetic body MB, for example, the bobbin BB around which the coil L is wound is disposed on the upper face of the flat plate portion FM of the metal member MM. In such a case, when the resin PT is filled into the first space, the resin PT enters into also at least a part of the space between the bobbin BB and the metal member MM. In other words, at least a part of the space between the bobbin BB and the metal member MM is buried in the resin PT. In accordance with this, the coil unit CU can transfer heat generated in the coil L to the cover member CV more efficiently. Here, the resin PT in which at least a part of the space between the bobbin BB and the metal member MM is buried may be configured not to be thermally connected to the resin PT that thermally connects at least a part of the coil L and at least a part of the casing BD or may be configured to be thermally connected to the resin PT that thermally connects at least a part of the coil L and at least a part of the casing BD.

Figure 3:
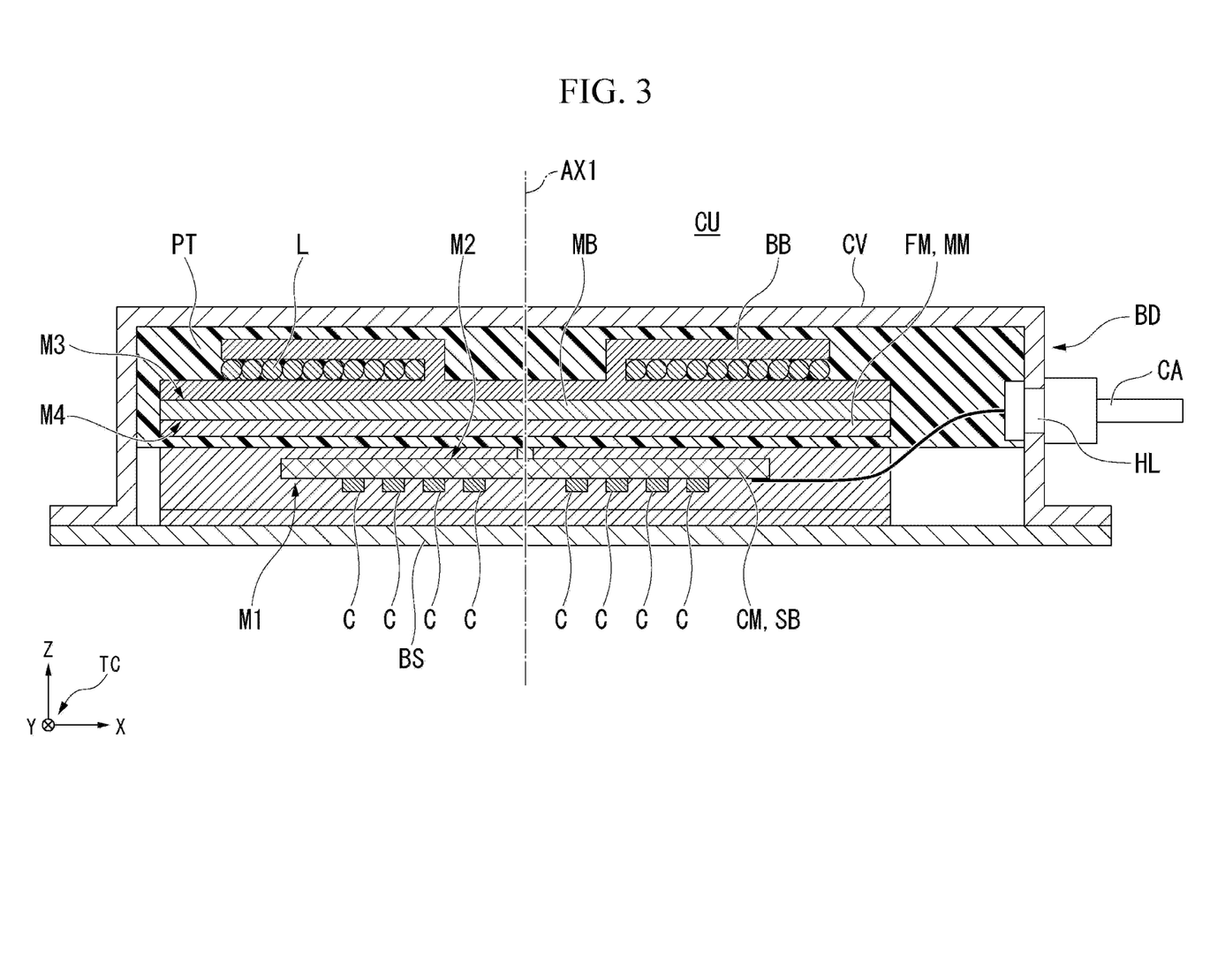
FIG. 3 is a diagram illustrating an example of the configuration of a coil unit CU in a case in which a casing BD has an opening HL.

In addition, the casing BD of the coil unit CU, as illustrated in FIG. 3, may be configured to have an opening HL through which a cable CA electrically connecting the capacitor module CM and the outside of the casing BD passes. FIG. 3 is a diagram illustrating an example of the configuration of the coil unit CU in a case in which the casing BD has the opening HL. In addition, FIG. 3 is a cross-sectional view of the coil unit CU through a first axis AX1 in a case in which the coil unit CU in the case is cut along a plane parallel to the first axis AX1. The cross-sectional view illustrated in FIG. 3, different from the cross-sectional view illustrated in FIG. 2, is a cross-sectional view of the coil unit CU in a case in which the coil unit CU is cut along a plane parallel to the X axis. For this reason, in FIG. 3, the protruding portions PR (in other words, the first protruding portion PR1 and the second protruding portion PR2) illustrated in FIG. 2 are not seen.

The opening HL is formed in the cover member CV of the casing BD. In the example illustrated in FIG. 3, the opening HL is formed in the cover member CV such that it connects an outer face on the positive side of the Y axis among outer surfaces of the cover member CV and an internal space of the casing BD. In the opening HL, a member used for allowing the cable CA to pass from the outside of the casing BD to the inside of the casing BD is installed. In this example, the substrate SB of the capacitor module CM and the cable CA are connected using a wiring. This wiring is electrically connected to the cable CA from the second space through a part of the resin PT.

In the example illustrated in FIG. 3, the opening HL is formed in the cover member CV such that it connects the outside of the casing BD and the first space. For this reason, the opening HL is covered with the resin PT inside the casing BD. In this way, the coil unit CU can inhibit liquid such as water and foreign materials such as dusts to enter the inside of the casing BD from the outside of the casing BD through the opening HL.

Figure 4:
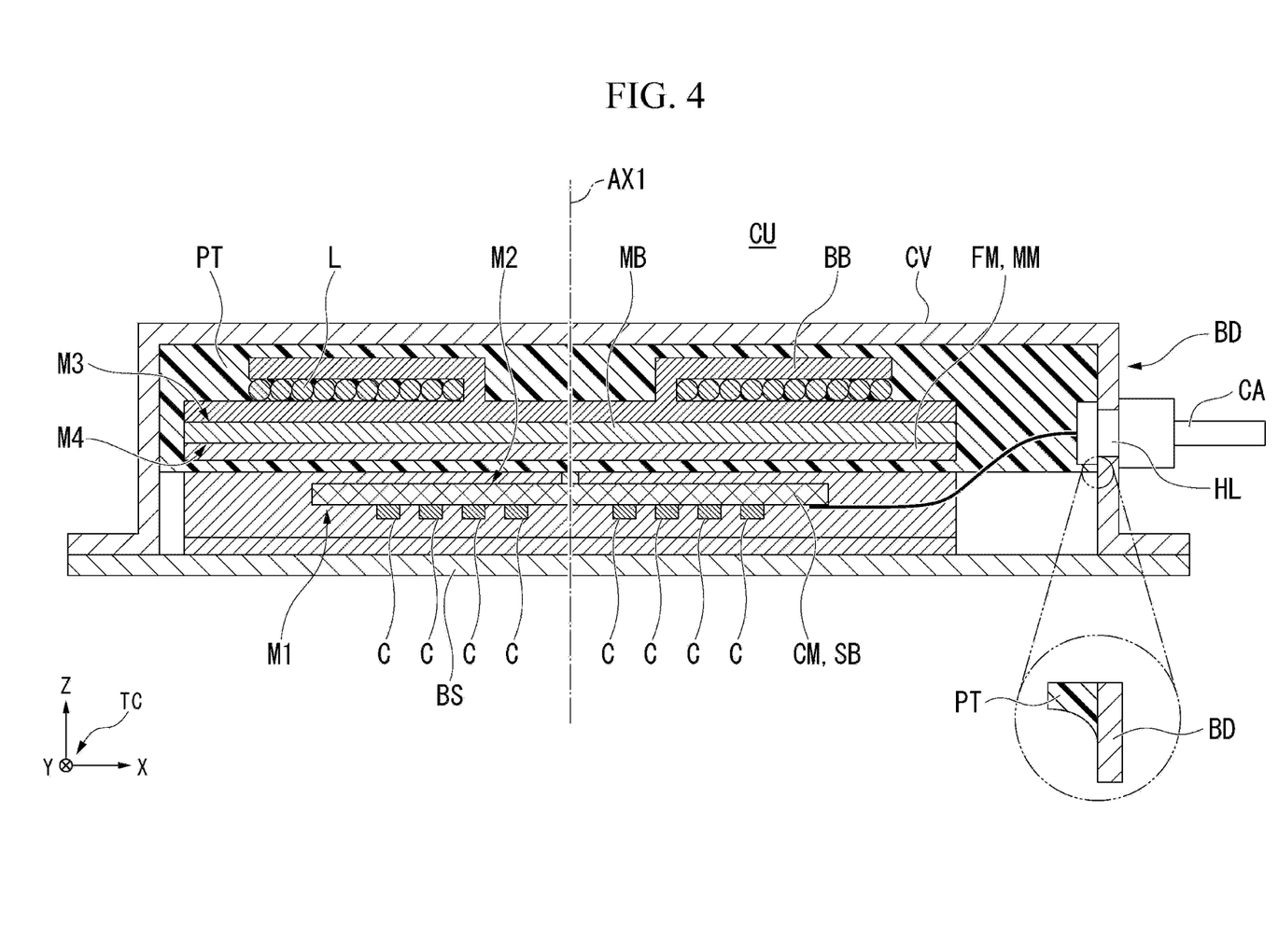
FIG. 4 is a diagram illustrating that, as a boundary between a first space and a second space becomes closer to a cover member CV, it becomes closer to a base member BS in the coil unit CU illustrated in FIG. 3.

As illustrated in FIG. 4, inside the casing BD, a boundary between the first space and the second space may be configured to be closer to the base member BS as it becomes closer to the cover member CV. In other words, as illustrated in FIG. 4, the boundary comes closer to the base member BS as the boundary coming closer to the cover member CV. FIG. 4 is a diagram illustrating that a boundary between the first space and the second space becomes closer to the base member BS as it becomes closer to the cover member CV in the coil unit CU illustrated in FIG. 3. According to this configuration, the coil unit CU can inhibit the resin PT to be peeled off from the cover member CV due to a difference between the thermal expansion coefficient of the resin PT and the thermal expansion coefficient of the cover member CV. In other words, according to this configuration, the coil unit CU can strengthen resistance to thermal shocks.

As described above, a coil unit (in the example illustrated above, the coil unit CU, the power transmission coil unit 12, and the power receiving coil unit 21) according to the embodiment includes: a coil (in the example described above, the coil L, the power transmission coil L1, and the power receiving coil L2) made of a conductor in a spiral shape at least around a first axis (in the example described above, the first axis AX1); a capacitor module (in the example described above, the capacitor module CM) including a substrate (in the example described above, the substrate SB) in which one or more capacitors (in the example described above, 8 capacitors C) are installed and configured to be disposed to be separate from the coil in an axial direction of the first axis; a casing (in the example described above, the casing BD) configured to have the coil and the capacitor module disposed inside; and a first resin (in the example described above, the resin PT) configured to thermally connect at least a part of the coil and at least a part of the casing, wherein the first resin is separated from the capacitors and the substrate. In accordance with this, the coil unit can decrease the installation area while inhibiting transfer of heat to the capacitors.

In the coil unit, a configuration in which the first resin is filled into a part of the inside of the casing and configured to thermally connect at least a part of the coil and at least a part of the casing may be used.

In the coil unit, a configuration in which a magnetic body (in the example described above, the magnetic body MB) configured to be disposed inside the casing and positioned between the coil and the capacitor module in an axial direction of the first axis and a metal member (in the example described above, the metal member MM) configured to be disposed inside the casing are further included, the metal member includes a flat plate portion (in the example described above, the flat plate portion FM) positioned between the coil and the capacitor module in the axial direction of the first axis and a protruding portion (in the example described above, the protruding portion PR, the first protruding portion PR1, and the second protruding portion PR2) protruding from the flat plate portion in a direction (in the example described above, the negative direction of the Z axis) from the coil to the capacitor module in the axial direction of the first axis, the casing includes a base member (in the example described above, the base member BS) to which the protruding portion is connected and a cover member (in the example described above, the cover member CV) that is assembled into the base member and forms a space for housing the coil, the capacitor module, the magnetic body, and the metal member, and the first resin thermally connects at least a part of the coil, at least a part of the magnetic body, at least a part of the metal member, and at least a part of the casing may be used.

In the coil unit, a configuration in which the first resin is filled into a part of the inside of the casing and thermally connects at least a part of the coil, at least a part of the magnetic body, at least a part of the metal member, and at least a part of the casing may be used.

In the coil unit, a configuration in which a boundary between a first space and a second space comes closer to the base member as the boundary coming closer to the cover member, the first space being a space that the first resin is filled among spaces inside the casing, and the second space being a space that the first resin is not filled among spaces inside the casing may be used.

In the coil unit, a configuration in which the first resin is filled into the casing in such a way a temperature of the base member to be higher than a temperature of the cover member by a heat generated in the coil may be used.

In the coil unit, a configuration in which at least a part of a space between the coil and the magnetic body is buried in a second resin (in the example described above, the resin PT in which at least a part of the space between the coil L and the magnetic body MB is buried) may be used.

In the coil unit, a configuration in which at least a part of a space between the magnetic body and the metal member is buried in a third resin (in the example described above, the resin PT in which at least a part of the space between the magnetic body MB and the metal member MM is buried) may be used.

In the coil unit, a configuration in which the first resin is thermally connected to at least a part of a face (in the example described above, the lower face of the flat plate portion FM) on a capacitor module side among faces of the flat plate portion may be used.

In the coil unit, a configuration in which the capacitor module includes a substrate (in the example described above, the substrate SB) that has a first main face (in the example described above, the first main face M1) on which the one or more capacitors are disposed and a second main face (in the example described above, the second main face M2) that opposes the first main face, and the first main face is located in an opposite side of the coil with respect to the second main face in the axial direction of the first axis may be used.

In the coil unit, a configuration in which the casing has an opening (in the example described above, the opening HL) through which a cable (in the example described above, the cable CA) connecting the capacitor module and the outside of the casing passes, and the opening is covered with the first resin inside the casing may be used.

As above, although the embodiment of the present invention has been described in detail with reference to the drawings, a specific configuration is not limited to this embodiment, and a change, a substitution, a deletion, and the like may be made in a range not departing from the concept of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Wireless power transmission system
10 Wireless power transmission device
11 Power transmission unit
12 Power transmission coil unit
20 Wireless power receiving device
21 Power receiving coil unit
22 Power receiving unit
AGV Mobile body
AX1 First axis
BB Bobbin
BD Casing
BS Base member
C Capacitor
CA Cable
CM Capacitor module
CU Coil unit
CV Cover member
FM Flat plate portion
G Ground surface
HL Opening
L Coil
L1 Power transmission coil
L2 Power receiving coil
M1 First main face
M2 Second main face
M3 Third principal face
M4 Fourth principal face
MB Magnetic body
MM Metal member
PR Protruding portion
PR1 First protruding portion
PR2 Second protruding portion
PT Resin
SB Substrate
TC Three-dimensional coordinate system

What is claimed is:

1. A coil unit comprising:
   a coil made of a conductor in a spiral shape at least around a first axis;
   a capacitor module (1) including a substrate in which one or more capacitors are installed and (2) separated from the coil in an axial direction of the first axis;
   a casing having the coil and the capacitor module inside;
   a first resin that fills a part of an inside of the casing and directly contacts at least a part of the coil and at least a part of the casing, the first resin being separated from the one or more capacitors and the substrate;

a magnetic body inside the casing and between the coil and the capacitor module in the axial direction of the first axis; and a metal member inside the casing, wherein the metal member includes a flat plate portion between the coil and the capacitor module in the axial direction of the first axis and a protruding portion protruding from the flat plate portion in a direction from the coil to the capacitor module in the axial direction of the first axis, the casing includes a base member to which the protruding portion is connected and a cover member that is assembled into the base member and forms a space for housing the coil, the capacitor module, the magnetic body, and the metal member, and the first resin thermally connects at least a part of the magnetic body and at least a part of the metal member.

2. The coil unit according to claim 1, wherein a boundary between a first space and a second space is closer to the base member as the boundary is closer to the cover member, the first space is a space that the first resin is filled among spaces inside the casing, and the second space is a space that the first resin is not filled among spaces inside the casing.

3. The coil unit according to claim 1, wherein the first resin fills the casing in such a way that a temperature of the base member is to be higher than a temperature of the cover member from a heat generated in the coil.

4. The coil unit according to claim 1, wherein at least a part of a space between the coil and the magnetic body is filled with a second resin.

5. The coil unit according to claim 1, wherein at least a part of a space between the magnetic body and the metal member is filled with a third resin.

6. The coil unit according to claim 1, wherein the first resin is thermally connected to at least a part of a face on a capacitor module side of the flat plate portion.

7. The coil unit according to claim 1, wherein the substrate has a first main face on which the one or more capacitors are disposed and a second main face that opposes the first main face, and the first main face is located in an opposite side of the coil with respect to the second main face in the axial direction of the first axis.

8. The coil unit according to claim 1, wherein the casing has an opening through which a cable connecting the capacitor module and the outside of the casing passes, and the opening is covered with the first resin inside the casing.

9. A wireless power transmission device comprising the coil unit according to claim 1.

10. A wireless power receiving device comprising the coil unit according to claim 1.

11. A wireless power transmission system comprising:

a wireless power transmission device; and a wireless power receiving device, wherein at least one of the wireless power transmission device and the wireless power receiving device includes the coil unit according to claim 1.

12. The coil unit according to claim 1, wherein the first resin is separated from the case.

* * * * *